United States Patent [19]

Stewart

[11] Patent Number: 4,507,439

[45] Date of Patent: Mar. 26, 1985

[54] ELASTOMERIC COMPOSITIONS CONTAINING TREATED PTFE

[75] Inventor: Charles W. Stewart, Newark, Del.

[73] Assignee: E. I. Du Pont de Nemours and Company, Wilmington, Del.

[21] Appl. No.: 555,488

[22] Filed: Nov. 28, 1983

[51] Int. Cl.³ .................. C08L 27/22; C08L 27/16; C08L 27/18

[52] U.S. Cl. .................. 525/199; 525/200; 525/195; 525/196; 525/326.2; 525/366; 525/367

[58] Field of Search .................. 525/199, 195, 196

[56] References Cited

U.S. PATENT DOCUMENTS

| | | | |
|---|---|---|---|
| 2,710,290 | 6/1955 | Safford et al. | 260/41 |
| 2,871,144 | 1/1959 | Doban | 117/138.8 |
| 3,019,206 | 1/1962 | Robb | 525/199 |
| 3,940,455 | 2/1976 | Kaufman | 260/888 |
| 4,326,046 | 4/1982 | Miyaka et al. | 525/276 |

FOREIGN PATENT DOCUMENTS

| | | |
|---|---|---|
| 54-013467 | 7/1979 | Japan . |
| 57-10895 | 3/1982 | Japan . |
| 1452429 | 10/1976 | United Kingdom . |
| 2084590 | 4/1982 | United Kingdom . |

OTHER PUBLICATIONS

A. A. Benderly, Treatment of Teflon to Promote Bondability, J. Appl. Polymer Science VI, 20, 221–225, (1962).

*Primary Examiner*—Carman J. Seccuro
*Attorney, Agent, or Firm*—Paul R. Steyermark

[57] ABSTRACT

An elastomeric composition comprising an elastomer matrix having dispersed therein about 3–30 parts per 100 parts by weight of the elastomer of powdered polytetrafluoroethylene having a number average molecular weight of at least about 250,000 and a surface area of at least 1 m²/g which has been treated with about 50–120% of sodium-naphthalene addition compound or another addition compound of an alkali metal required for the alkali metal to react with all the fluorine atoms on the surface of the polytetrafluoroethylene powder.

By dispersing such treated polytetrafluoroethylene powder in elastomer matrix, one increases significantly the tear strength of the elastomer, while increasing its modulus only moderately. In this way, the processability of the elastomeric compositions is not adversely affected.

14 Claims, No Drawings

4,507,439

ELASTOMERIC COMPOSITIONS CONTAINING TREATED PTFE

BACKGROUND OF THE INVENTION

This invention relates to elastomeric compositions having improved tear strength and good processability.

Many industrially important elastomers have low tear strength and/or low cut growth resistance, which shortcomings decrease their utility in applications such as, for example, belts and tubing for automotive and other applications. It is known to increase the tensile stength and to improve the tear strength of various elastomers by the addition of polytetrafluoroethylene (PTFE) powder; see, for example, U.S. Pat. No. 3,940,455 to Kaufman and Japanese Patent Publication Kokai No. 57-10895 (1982) of Daikin Kogyo K.K.

Since, however, PTFE powder does not have good compatibility with most elastomers, including fluoroelastomers, it cannot be readily dispersed in an elastomer to give a uniform composition. Those prior art PTFE powder-containing elastomeric compositions usually had a non-uniform, blotchy appearance. In addition, their modulus was considerably increased, sometimes to the point where they were no longer processible in conventional equipment by normal techniques.

It is known from U.S. Pat. No. 2,871,144 to Doban to modify the surfaces of fluorocarbon polymer articles to improve their bondability by treating those surfaces with solutions of alkali metal additives with aromatic hydrocarbons. It also is known from Japanese Pat. No. 79/013467 to Sumitomo Electric Ind. K.K. to treat PTFE powder with sodium-naphthalene, to mix such treated powder with a lubricating liquid, and to extrude it into a sheet.

There has been no disclosure or suggestion, however, that treated PTFE powder could be dispersed in a variety of elastomeric materials to give uniform elastomeric compositions having improved tear strength and good processability.

SUMMARY OF THE INVENTION

According to the present invention, there is provided an elastomeric composition comprising an elastomer matrix having dispersed therein about 3–30 parts per 100 parts by weight, based on the elastomer, of powdered polytetrafluoroethylene having a number average molecular weight of at least about 250,000 and a surface area of at least 1 $m^2/g$, as determined by the BET (Brunauer, Emmett, Teller) technique, which has been treated with an amount of an addition compound of an alkali metal of about 50–120% of the theoretical amount required for the alkali metal to react with all the fluorine atoms on the surface of the polytetrafluoroethylene powder. Preferably, the amount of the alkali metal addition compound is not over the theoretical amount.

For the purpose of the present disclosure, the term "elastomer" means that the material, when stretched to twice its original length and released, will return with force to substantially its original length.

DETAILED DESCRIPTION OF THE INVENTION

PTFE powder suitable in the process of the present invention can be obtained by grinding commercially available PTFE in conventional grinding equipment such as, for example, Taylor-Stiles rotary mill (Day Mixing, Cinncinati, OH 45212) or Nelmor granulator (Nelmor Co., N. Uxbrigde, MA 01538). PTFE powder can also be obtained commercially from E. I. du Pont de Nemours and Company, Wilmington, Del. The powder surface area is determined by the well known BET technique, ASTM No. C-819-77, and normally is about 1 to 5 $m^2/g$. The usual particle size in its largest dimension is about 0.2 to 1 $\mu m$.

Alkali metal addition compounds include the addition compounds of sodium, potassium, lithium, rubidium, or cesium, particularly with aromatic hydrocarbons, especially polynuclear hydrocarbons such as naphthalene or anthracene, and with ammonia and organic amines. The preferred alkali metal addition compounds are sodium compounds. Sodium-naphthalene is the most convenient alkali metal addition compound which can be used in treating the PTFE powder. It is commercially available from W. L. Gore & Associates, Inc., Wilmington, Del., under the tradename "Tetra-Etch". Other suitable alkali metal addition compounds can be any of those which are suitable in the process of U.S. Pat. No. 2,871,144, including any of those described in the references listed in column 1 of that patent: Scott et al., J. Am. Chem. Soc. 58, 2442 (1936); Walker et al., ibid. 60, 951 (1938); Paul et al., ibid. 78, 116 (1956); and Yu et al., ibid. 76, 3367 (1954).

The active portion of the addition compounds useful in the present invention is the alkali metal, and they react like the alkali metal itself, but they have an advantage over the alkali metal in that they can be handled more easily, are soluble in various organic solvents, and can be decomposed with either water or an alcohol without a violent reaction. When an alkali metal or its addition compound reacts with PTFE, it removes fluorine atoms from the polymer surface, leaving what is believed to be essentially a hydrocarbon surface having a number of active sites. Various atoms or radicals can attach themselves to those active sites, including aromatic hydrocarbon groups, oxygen, hydroxyl groups, and hydrogen atoms.

Ideally, this modified surface layer should be of uniform monomolecular thickness; if it is incomplete, that is, involving less than the total surface area, less improvement or no improvement may be obtained; if it is too thick, a weak interlayer between the treated PTFE particles and the elastomer in the final elastomeric composition may form, resulting in lower tensile properties and tear strength of the composition. However, when an amount of alkali metal additive within the recited range is used, an effective area of modified surface layer of correct thickness is obtained. When an amount of alkali metal additive in excess of the optimum range is used, the excess surface reaction products following the treatment can be removed by washing with a hypochlorite solution.

If desired, the thickness of the modified PTFE layer can be determined by ESCA (Electron Spectroscopy for Chemical Analysis), for example, as described by Dwight et al. in J. Colloid and Interface Science, 47, 650 (1974).

The treatment of PTFE powder with sodium-naphthalene or other alkali metal additive can take place in a number of ways; for example, by stirring the polymer powder with a solution of the agent in an appropriate solvent, usually tetrahydrofuran, or by percolating the solution through the polymer powder, or by rolling the powder with the solution on a rubber mill. The operation preferably should be conducted in a sealed vessel, in the absence of moisture, and in the absence of air or under nitrogen. The contact time can vary from about 1 minute to about 12 hours. The treated powder is filtered off or otherwise separated from the liquid, washed with tetrahydrofuran, then with water, and dried.

While untreated polytetrafluoroethylene powder tends to agglomerate, the treated powder is free-flowing. It can be kept for extended periods, probably indefinitely, without losing its physical characteristics and desirable surface properties.

The improved elastomeric compositions of the present invention are made by blending together an elastomer and the treated PTFE powder in the specified weight proportions. For the purpose of this disclosure, the term "elastomer" has its normal meaning; that is, the material, after being stretched to twice its normal length and released, will return with force to substantially its original length. Blending can be accomplished in any conventional equipment such, for example, as an internal mixer, a Banbury mixer, or a rubber mill. Other fillers and pigments, especially those conventionally used in compounding elastomers, may be added during this step; for example, carbon black, talc, calcium carbonate, barium sulfate, clay, titanium dioxide, silica powder, alumina, etc. Likewise, curing agents, accelerators, antioxidants, stabilizers, and lubricants can be added in their usual amounts.

Any elastomer can be used as the matrix in which the PTFE powder is to be dispersed. Representative elastomers include chloroprene polymers and copolymers; hydrocarbon polymers such as ethylene/propylene copolymers, terpolymers and tetrapolymers of ethylene with propylene and with one or two diene monomers (these terpolymers and tetrapolymers are known as EPDM rubbers or EPDM elastomers); styrene-butadiene copolymers (so-called SBR's) and terpolymers with acrylonitrile; ethylene/vinyl acetate copolymers and terpolymers with carbon monoxide; ethylene/methyl methacrylate dipolymers and terpolymers with carbon monoxide; polyurethanes; natural rubber; and fluoropolymers such as, for example, vinylidene fluoride/hexafluoropropene and vinylidene fluoride/perfluoro(alkyl vinyl ether) dipolymers and terpolymers with tetrafluoroethylene.

Those of the above elastomeric compositions which are curable can then be cured in the usual manner, normally, by heating to a sufficiently high temperature for a sufficiently long period; for example, 30 minutes at 177° C., frequently followed by postcure at 232° C. for several hours.

This invention is now illustrated by the following examples of certain preferred embodiments thereof, wherein all parts, proportions, and percentages are by weight unless otherwise indicated.

A sodium-naphthalene solution was prepared by adding 23 g of sodium metal to a solution of 128 g of naphthalene (1 mole of each) in 1 liter of tetrahydrofuran in a 2-liter flask equipped with a stirrer and a drying tube. The mixture was stirred for two hours to complete the reaction. See Scott et al. J. Am. Chem. Soc. 58 2442 (1936). This solution, which contained 14.5% of sodium-naphthalene, was used in all the examples.

PTFE powder was a commercial material (from E. I. du Pont de Nemours and Company, Wilmington, Del.), which had a number average molecular weight of $50 \times 10^6$ as measured by differential scanning calorimetry according to the empirical equation $Mn = (2.1 \times 10^{10})(\Delta H_c^{-5.16})$, where $\Delta H_c$ is the heat of crystallization from the melt in cal/g, and a BET surface area of about 2 $m^2/g$. The theoretical amount of sodium-naphthalene required to react with all the fluorine atoms on the PTFE powder surface was about 2.5 mmoles/100 $m^2$ of surface.

EXAMPLE 1

To each of three dispersions of 100 g of PTFE powder in 600 mL of tetrahydrofuran prepared using a homomixer there were added under nitrogen varying amounts of the sodium-naphthalene solution. No sodium-naphthalene solution was added to a fourth dispersion. All dispersions were stirred for four hours; the PTFE was filtered off, washed with tetrahydrofuran and with water, and dried overnight at 100° C. The dry powders were milled into a commercial vinylidene fluoride/hexafluoropropene copolymer compounded as follows: 100 parts of copolymer, 3 parts of magnesium oxide, 6 parts of Ca (OH)$_2$, and 15 parts of PTFE powder. The compounds were sheeted out, pressed into 0.2 cm-thick slabs, cured at 177° C. for 30 minutes, and postcured at 232° C. for four hours.

The slabs were visually observed and evaluated from the standpoint of shape retention, surface appearance, and uniformity. Test pieces were cut from the slabs for the determination of their tensile properties (ASTM D-412) and tear strength (ASTM D-470). The results are given below in Table I.

TABLE I

|  | Control* | A | B | C | D |
|---|---|---|---|---|---|
| Sodium-naphthalene solution (g/100 g PTFE) | — | 0 | 1.5 | 3 | 6 |
| Sodium-naphthalene (g/100 g PTFE) | — | 0 | 0.218 | 0.435 | 0.870 |
| Sodium-napthalene (mmoles/100 $m^2$ PTFE) | — | 0 | 0.72 | 1.44 | 2.88 |
| % of theoretical amt. | — | 0 | 29 | 58 | 115 |
| Modulus, $M_{100}$ (MPa) | 1.4 | 8.3 | 9.8 | 2.8 | 4.1 |
| Tensile at break, $T_B$ (MPa) | 7.8 | 10.3 | 10.1 | 7.8 | 6.3 |
| Elongation at break, $E_B$ (%) | 320 | 220 | 250 | 250 | 200 |
| Tear Strength (KN/m) | 3.5 | 9.6 | 10.5 | 10.4 | 6.4 |
| Appearance |  | Rough Surfaces, PTFE agglomerates, slabs slightly distorted | | | Smooth, No PTFE agglomerates, slabs not distorted |

*This sample contained no PTFE powder.

It can be seen from the above data that addition of untreated PTFE (Sample A) powder considerably increased the tear strength of the elastomer. However, when either untreated PTFE or PTFE treated at the level of 29% of the theoretical amount (Sample B) was used, the modulus of the vulcanized elastomer increased by a factor of about 6–7. When the amount of sodium-naphthalene was increased to 58% of the theoretical amount (Sample C), the tear strength of the vulcanizate tripled, while the modulus only doubled. Sample D was above the theoretical amount and outside the optimum range of sodium naphthalene/PTFE ratios, and in this case the tear strength improvement was the most modest, while the increase of modulus still was 200%.

EXAMPLE 2

In this example a large excess of sodium naphthalene/PTFE powder ratio was used.

To a dispersion of 100 g of polytetrafluoroethylene powder in 300 mL of tetrahydrofuran, there was added 30 g of the 14.5% solution of of sodium-naphthalene in tetrahydrofuran. This corresponded to 4.27 mmoles of sodium-naphthalene per 100 m² of surface area or 171% of the theoretical amount. The dispersion was stirred overnight; the treated PTFE powder was filtered off, washed with tetrahydrofuran, and placed in 200 mL of a 5% aqueous solution of sodium hypochlorite to which 5 g of a commercial alkyl aryl polyether alcohol nonionic surfactant (Triton ® X-100, Rohm & Haas) had been added. This mixture was stirred for 2 hours to remove excess of decomposition products, as described in Dwight et al., J. Colloid and Interface Science, 47, 650 (1974), and filtered. The solid material was washed with water and with tetrahydrofuran and dried overnight at 100° C.

Elastomer compounds containing 100 parts of vinylidene fluoride/hexafluoropropylene copolymer, 3 parts of magnesium oxide, and 6 parts of Ca(OH)$_2$ were prepared. One of those was used as a control; untreated PTFE powder was milled into the second compound, and treated PTFE powder was milled into the third compound. All the compounds were sheeted out, pressed into 0.2 cm thick slabs, cured, and postcured as in Example 1. The cured elastomer slabs containing untreated PTFE powder had rough surfaces, were distorted, and contained visible particles of agglomerated PTFE powder and PTFE fibrils. The slabs containing treated PTFE powder were smooth and undistorted, with no visible agglomeration. Tensile and tear properties were determined on test pieces as in EXAMPLE 1. The results are shown below in Table II.

TABLE II

|  | Control | A | B |
|---|---|---|---|
| Untreated PTFE (g/100 g of elast.) | — | 15 | — |
| Treated PTFE (g/100 g of elast.) | — | — | 15 |
| $M_{100}$ (MPa) | 1.4 | 8.5 | 5.2 |
| $T_B$ (MPa) | 7.8 | 10.2 | 9.0 |
| $E_B$ (%) | 320 | 320 | 310 |
| Tear (kN/m) | 3.5 | 14 | 18 |

As observed earlier, untreated PTFE powder (Sample A) significantly improved the tear strength but also increased the modulus by about 500%. The treated PTFE powder (Sample B) improved the tear strength even more but increased the modulus less, only about 270%. Thus, even though the amount of sodium-naphthalene was well above the desired range, the additional treatment with sodium hypochlorite produced acceptable PTFE powder.

EXAMPLE 3

To a dispersion of 100 g of PTFE powder in 350 mL of tetrahydrofuran was added 6 g of the 14.5% solution of sodium-naphthalene, which corresponded to 2.88 mmoles of sodium-naphthalene per 100 m² of surface area or 115% of the theoretical amount. The dispersion was stirred for one hour; the PTFE was recovered by filtration and further treated with an aqueous sodium hypochlorite solution as in Example 2, then again filtered off, washed with water, and dried overnight at 100° C. Carbon black-filled elastomer compounds containing 100 parts of vinylidene fluoride/hexafluoropropene copolymer, 3 parts of magnesium oxide, 6 parts of Ca(OH)$_2$, MT Black as indicated, and PTFE powder as indicated were prepared, formed into slabs, cured, and postcured as in the preceding examples. Tensile properties and tear strength of the cured elastomers were determined as before. The results are given in Table III, below.

TABLE III

|  | Control | A | B | C | D |
|---|---|---|---|---|---|
| MT black (g/100 g of elast.) | 30 | 20 | 15 | 20 | 15 |
| Untreated PTFE powder (g/100 g of elast.) | — | 10 | 15 | — | — |
| Treated PTFE powder (g/100 g of elastomer) | — | — | — | 10 | 15 |
| $M_{100}$ (MPa) | 5.3 | 7.5 | 9.0 | 5.8 | 6.2 |
| $T_B$ (MPa) | 11.1 | 15.0 | 12.2 | 13.8 | 14.5 |
| $E_B$ (%) | 180 | 270 | 200 | 240 | 260 |
| Tear (kN/m) | 3.7 | 7.0 | 14.0 | 6.2 | 12.1 |

It will be noted that in all the formulations the total amount of carbon black plus PTFE powder was 30 g/100 g of elastomer. Untreated PTFE powder, which was used in compounds A and B, increased the tear strength of the vulcanized material but at the same time increased the modulus by about 42-70%. Treated PTFE powder increased the tear strength slightly less but still very significantly, while it increased the modulus by a much more moderate amount of about 10-17%.

EXAMPLE 4

Portions of the treated PTFE powder prepared in Example 3 were milled into typical EPDM rubber and SBR formulations as follows:

|  | Parts |
|---|---|
| Ethylene/propylene/hexene-1 terpolymer (EPDM rubber) | 100 |
| Zinc oxide | 5 |
| Stearic acid | 1 |
| HAF Black | 80 |
| Sunpar ® processing oil (Sun Oil) | 70 |
| Zinc dibutyl dithiocarbamate | 2 |
| Tetraethylthiuram disulfide | 0.5 |
| Zinc salt of a mercaptobenzothiazole | 1 |
| Sulfur | 1.5 |
| Treated PTFE powder | 10 |
| Cured 20 minutes at 160° C. | |
| Styrene/butadiene copolymer (SBR 1500) | 100 |
| Stearic acid | 2 |
| Zinc oxide | 5 |
| Sulfur | 2 |
| 2-mercaptobenzothiazole | 1.5 |
| Copper dimethyldithiocarbamate | 0.1 |
| HAF Black | 50 |
| Treated PTFE powder | 10 |
| Cured 30 minutes at 153° C. | |

Tensile properties and tear strengths were determined for the above vulcanized elastomers as well as for the corresponding elastomer compounds containing 10 parts of untreated PTFE powder instead of treated PTFE powder and compounds containing no added PTFE powder. The test results are given in Table IV, below:

TABLE IV

| Polymer Sample | EPDM Rubber | | | SBR | | |
|---|---|---|---|---|---|---|
|  | Contr. 1 | A | B | Contr. 2 | C | D |
| Untreated PTFE powder | — | + | — | — | + | — |
| Treated PTFE powder | — | — | + | — | — | + |

TABLE IV-continued

| Polymer Sample | EPDM Rubber | | | SBR | | |
|---|---|---|---|---|---|---|
| | Contr. 1 | A | B | Contr. 2 | C | D |
| $M_{100}$ (MPa) | 1.4 | 6.2 | 3.9 | 2.8 | 12.1 | 7.5 |
| $T_B$ (MPa) | 15.1 | 14.6 | 14.8 | 27.0 | 27.0 | 26.5 |
| $E_B$ (%) | 640 | 580 | 575 | 420 | 370 | 390 |
| Tear (kN/m) | 14.4 | 20.5 | 25.0 | 10.4 | 13.6 | 15.8 |

As in the previous examples with a vinylidene fluoride/hexafluoropropene copolymer, this example shows that addition to other elastomer compounds of untreated PTFE powder (Samples A and C) significantly increased both the tear strength and the modulus. For the EPDM rubber the modulus increased by about 340% and for the SBR by about 330%. Treated PTFE powder produced larger increases of the tear strength but much smaller increases of the modulus. For Sample B the modulus changed by only about 180% and for Sample D by only about 170%.

I claim:

1. An elastomeric composition comprising an fluoroelastomer matrix having dispersed therein about 3-30 parts per 100 parts by weight, based on the fluoroelastomer, of powdered polytetrafluoroethylene having a number average molecular weight of at least about 250,000 and a surface area of at least 1 m²/g, as determined by the BET technique, which powdered polytetrafluoroethylene has been treated with an amount of an addition compound of an alkali metal of about 50-120% of the theoretical amount required for the alkali metal to react with all the fluorine atoms on the surface of the polytetrafluoroethylene.

2. An elastomeric composition of claim 1 wherein the amount of the alkali metal addition compound is at most about the theoretical amount required for the alkali metal to react with all the fluorine atoms on the surface of the polytetrafluoroethylene.

3. An elastomeric composition of claim 1 wherein the alkali metal addition compound is an addition compound with an aromatic hydrocarbon, ammonia, or an organic amine.

4. An elastomeric composition of claim 3 wherein the addition compound is an addition compound with an aromatic hydrocarbon.

5. An elastomeric composition of claim 4 wherein the aromatic hydrocarbon is naphthalene or anthracene.

6. An eleastomeric composition of claim 5 wherein the alkali metal is sodium.

7. An elastomeric composition of claim 1 wherein the alkali metal addition compound is an addition compound of sodium with a polynuclear aromatic hydrocarbon.

8. An elastomeric composition comprising an fluoroelastomer matrix having dispersed therein about 3-30 parts per 100 parts by weight, based on the fluoroelastomer of powdered polytetrafluoroethylene having a number average molecular weight of at least about 250,000 and a surface area of at least 1 m²/g, as determined by the BET technique, which has been treated first with an amount of an addition compound of an alkali metal above the theoretical amount required for the alkali metal to react with all the fluorine atoms on the surface of the polytetrafluoroethylene powder and then with a hypochlorite solution to remove excess surface reaction products.

9. An elastomeric composition of claim 8 wherein the alkali metal addition compound is an addition compound with an aromatic hydrocarbon, ammonia, or an organic amine.

10. An elastomeric composition of claim 9 wherein the addition compound is an addition compound with an aromatic hydrocarbon.

11. An elastomeric composition of claim 10 wherein the aromatic hydrocarbon is naphthalene or anthracene.

12. An elastomeric composition of claim 11 wherein the alkali metal is sodium.

13. An elastomeric composition of claim 8 wherein the alkali metal addition compound is an addition compound of sodium with a polynuclear hydrocarbon.

14. An elastomeric composition of claim 8 wherein the fluoroelastomer is a vinylidene fluoride/hexafluoropropene copolymer.

* * * * *